Dec. 3, 1968  G. HEIM  3,414,320
SLIDING ROOF, ESPECIALLY FOR MOTOR VEHICLES
Filed Feb. 24, 1967  3 Sheets-Sheet 1
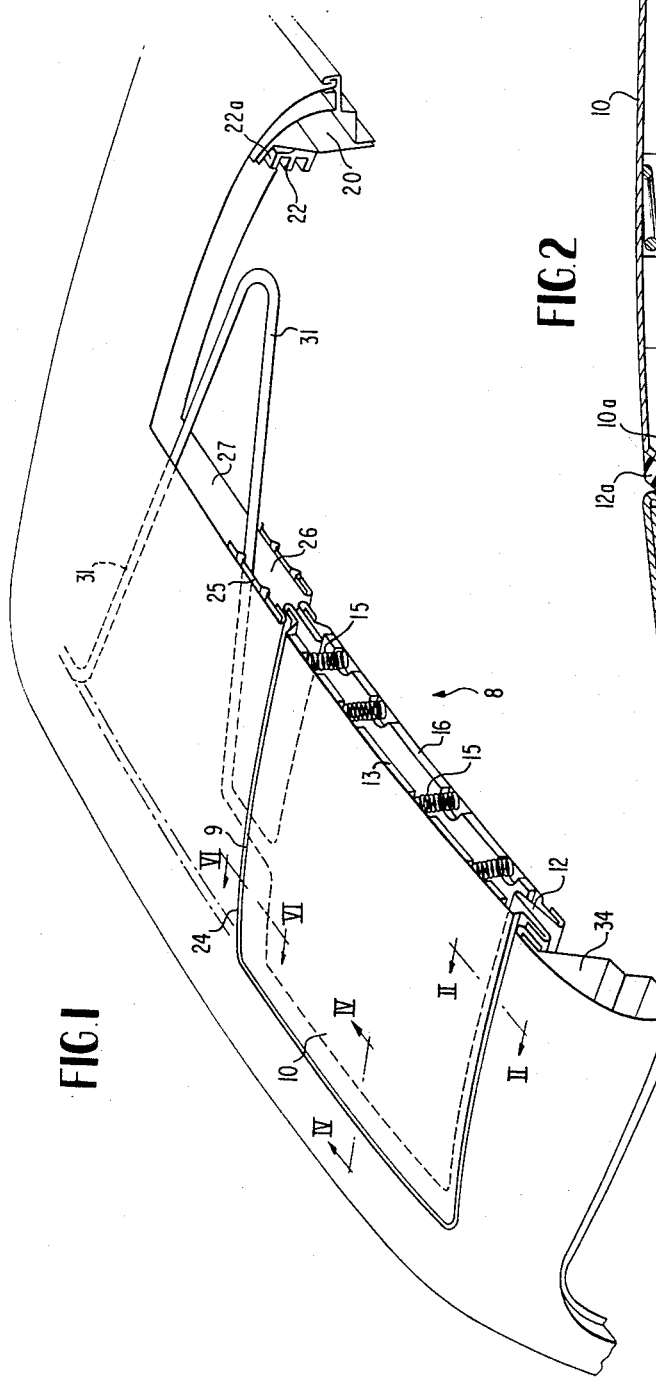
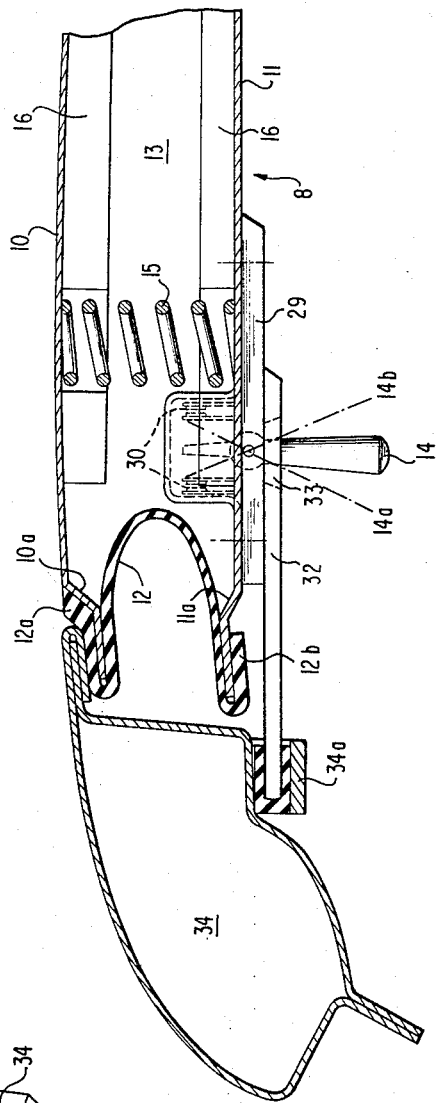
INVENTOR
GERHARD HEIM
BY *Alicker & Craig*
ATTORNEYS

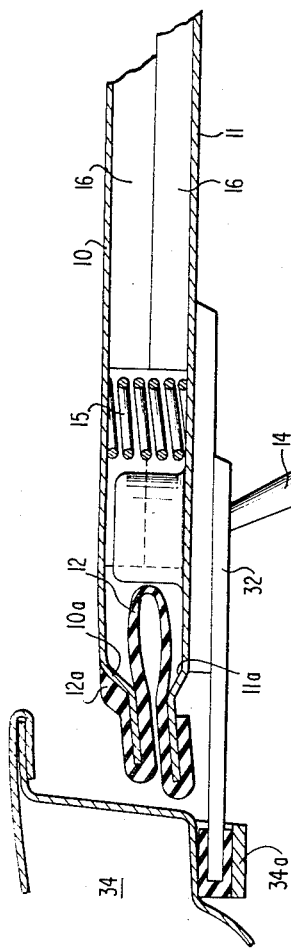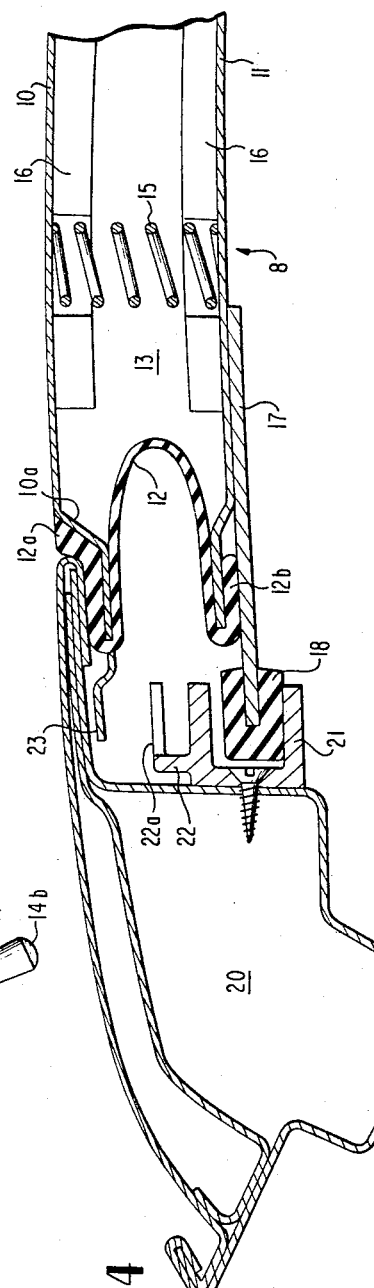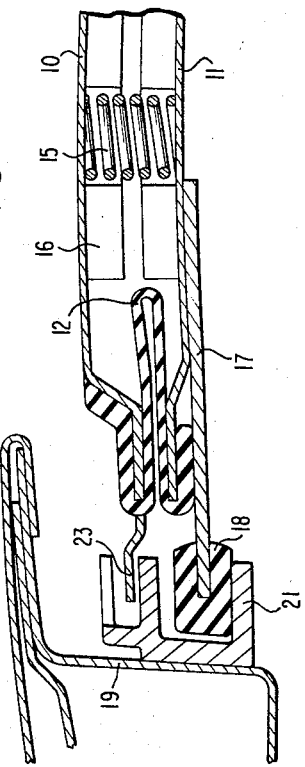

Dec. 3, 1968   G. HEIM   3,414,320
SLIDING ROOF, ESPECIALLY FOR MOTOR VEHICLES
Filed Feb. 24, 1967   3 Sheets-Sheet 3
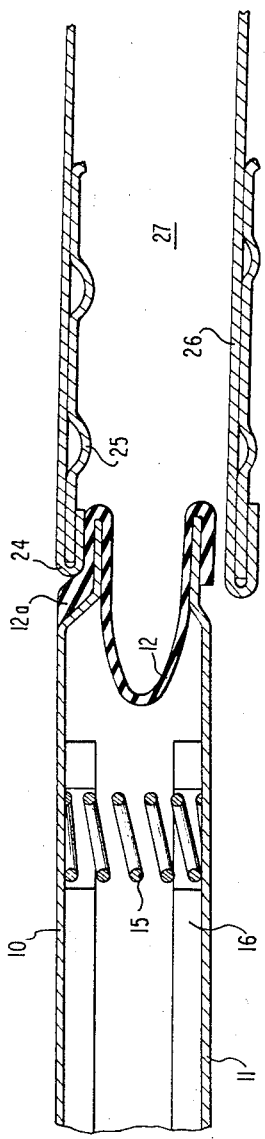
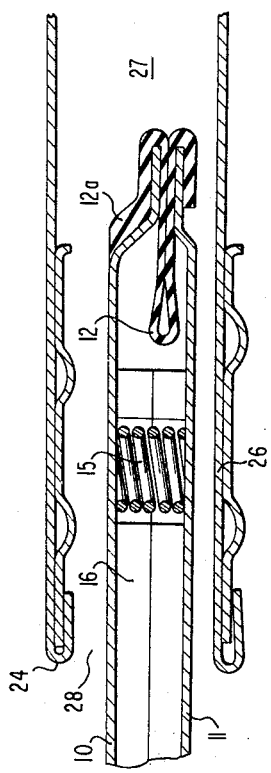
INVENTOR
GERHARD HEIM
BY *Dicke & Craig*
ATTORNEYS

United States Patent Office 3,414,320
Patented Dec. 3, 1968

3,414,320
SLIDING ROOF, ESPECIALLY FOR
MOTOR VEHICLES
Gerhard Heim, Sindelfingen, Germany, assignor to Daimler-Benz Aktiengesellschaft, Stuttgart-Unterturkheim, Germany
Filed Feb. 24, 1967, Ser. No. 618,488
Claims priority, application Germany, Nov. 11, 1966,
D 51,523
22 Claims. (Cl. 296—137)

ABSTRACT OF THE DISCLOSURE

A sliding roof for a vehicle, especially a motor vehicle, which comprises rigid outer and inner plates interconnected by elastic wall means along the edges thereof to form an air-tight chamber having a variable volume, whereby the two plates are normally urged away from each other by resilient means such as coil springs arranged between the same, and the sliding roof is appropriately guided in guide rails arranged along the longitudinal edges of the roof aperture while the roof chamber thus formed can be selectively connected either with the atmosphere for securing the roof in a given position or with a source of vacuum to facilitate the sliding movements of the roof.

Background of the invention

The present invention relates to a sliding roof for vehicles, especially for motor vehicles movably supported in guide rails.

The known sliding roofs have to be relatively heavy for reasons of rigidity. This requires a reinforcement of the roof bearers and above all a very disadvantageous difficulty to move the sliding roof. Consequently, the opening of the locking mechanisms of the top or roof as well as the displacement of the sliding roof require a considerable force which cannot be applied in particular by female or older persons. Servo-mechanisms used heretofore for purposes of facilitating the opening and closing of the roof are, for the most part, bulky and therefore require increased amounts of space in addition to the additional weight load caused thereby. With the current modern vehicles having flat and low roofs, the strong and heavy roofs provided with the seals work out particularly unfavorably. The expensive water drainage installations at the sliding roofs customary heretofore represent a further disadvantage. Furthermore, the aperture cross section is limited thereby and the head freedom is reduced. The manufacture of these individual parts is cumbersome and requires accurate fittings and small tolerances.

Summary of the invention

The elimination of these difficulties is the purpose of the present invention. The solution according to the present invention essentially consists in that the rigid outer and inner plates of the sliding roof are connected along the edges thereof by elastic means into a hollow chamber having a variable volume whereby the two plates are spread apart by spring means and one of the plates is guided in guide rails, and whereby the chamber is adapted to be selectively connected in each position by way of a shifting element either with a vacuum line carrying a vacuum for the purpose of movement of the sliding roof in the roof aperture or with the atmosphere for purposes of fixing or securing the sliding roof in the roof aperture.

The sliding roof constructed in accordance with the present invention is very easily movable because the clamping effect is lifted during the displacement. Simultaneously therewith, a good springy abutment is achieved in the closed position and in a fixed opening position. The arrangement is also simple in manufacture and assembly whereby, however, the good stability and rigidity of solid sliding roofs made from steel is maintained.

In principle, it is immaterial which of the two roof plates runs in the guide rails. However, the present invention prefers a solution whereby the inner plate is guided in the guide rails and the outer plate is movable relative thereto. In this manner, the roof offers a uniform appearance in the vehicle interior.

According to one embodiment of the present invention, a thin strip bent through or deflected inwardly toward the roof center and made from springy, resilient material forms the side wall of the chamber and is secured with its edges in an air-tight manner at the mutually offset edge portions of the outer and inner plates. The strips consist advantageously of springy, resilient water-tight and wear-resistant material which is resistant to oil and acids as well as to alkalis.

It is immaterial as such, how the spreading springs are constructed. A portion of the spring force is derived anyhow from the springy edge strips. However, the present invention prefers a solution whereby several coil springs are arranged between the plates, preferably near the lateral edges. The spring force of all springs together with that of the edge strips is thereby smaller than the force exerted on the outer plate by the vacuum. Furthermore, according to the present invention, a shifting lever is pivotally secured in the forward part of the inner plate as shifting and switching element; in the two lateral end positions of the shifting lever, a magnetic valve arranged in the line between the vacuum source and the chamber is opened or closed by way of associated contacts. As considerable advantage a simple manipulation during opening and closing is achieved by this arrangement exclusively by means of a pivotal lever adapted to be pivoted by a slight finger pressure.

With one construction according to the present invention, guide rails are secured at each side of the roof aperture, in whose grooves engage slidingly strips or bars which are secured at the inner plate of the sliding roof and project laterally beyond the same. These guide rails have an upwardly extending web which is provided with at least one inwardly bent arm.

Furthermore, the present invention proposes that the outer plate and possibly also the inner plate of the sliding roof are covered on the inside thereof with a thick insulation or damping layer, for example, with a honeycombed plate of soft, resilient synthetic plastic material of any suitable convention type, as a result of which a high freedom from noise is achieved during opening and closing as well as generally in any position. It is thereby appropriate if the layers are provided with apertures for the springs and terminate at a distance from the folded-together edge strips.

The sliding roof of the present invention is particularly appropriate by reason of its easy handling during opening and closing. This sliding roof according to the present invention also results in large sliding paths. It is suitable in particular for the present-day flat roof shapes, and it also does not impair the seat height in the back seats, especially not along the sides because of slight structural height. On the other hand, the useful opening of the roof aperture can be increased by this construction since the usual devices and installations for a tight closure can be dispensed with. Additionally, the usual water drainage can also be eliminated.

The cost during the manufacture of the sliding roof according to the present invention is small as it consists only of few parts and as only few parts are movable. Furthermore, no small tolerances need to be maintained whereby also the unavoidable changes in dimensions during the operation, especially over a longer period of time, are harmless.

Accordingly, it is an object of the present invention to provide a sliding roof which eliminates by simple means the aforementioned shortcomings and drawbacks encountered with the prior art constructions.

Another object of the present invention resides in a sliding roof, especially for motor vehicles, which can be manipulated easily, requires no bulky, heavy servo-mechanisms and is of relatively over-all light-weight construction without sacrificing its rigidity.

A further object of the present invention resides in a sliding roof which does not impair the head room even in vehicles conforming to the present day designs in motor vehicles which have relatively low, flat roofs.

Still a further object of the present invention resides in a sliding roof which can be sealed easily and permits the elimination of the water drainages necessary heretofore.

Another object of the present invention resides in a sliding roof which requires only few parts involving inexpensive manufacture and assembly.

A further object of the present invention resides in a sliding roof which eliminates close tolerances for purposes of manufacture and assembly without jeopardizing rigidity and reliability in operation.

Still a further object of the present invention resides in a sliding roof for motor vehicles which can be controlled in a simple way and requires only a slight finger pressure.

These and other objects, features, and advantages of the present invention will become more obvious from the following description when taken in connection with the accompanying drawing which shows, for purposes of illustration only, one embodiment in accordance with the present invention, and wherein:

FIGURE 1 is a partial perspective view, partly in cross section, of a motor vehicle top provided with a sliding roof in accordance with the present invention;

FIGURE 2 is a partial cross-sectional view taken along line II—II of FIGURE 1 with the sliding roof thereof in the closed position;

FIGURE 3 is a partial cross-sectional view, similar to FIGURE 2, showing the sliding roof in the position of FIGURE 2, but lowered for purposes of opening;

FIGURES 4 and 5 are partial cross-sectional views taken along line IV—IV of FIGURE 1, with the sliding roof in the closed and lowered positions, respectively; and FIGURES 6 and 7 are partial cross-sectional views taken along line VI—VI of FIGURE 1, with the sliding roof in the closed position and in the rearwardly displaced position, respectively.

Referring now to the drawing wherein like reference numerals are used throughout the various views to designate like parts, and more particularly to FIGURE 1, the sliding roof generally designated therein by reference numeral 8 which is arranged in the roof aperture 9 of a motor vehicle, consists essentially of two approximately flat or moderately upwardly curved sheet metal plates 10 and 11 provided with edges 10a and 11a mutually offset toward one another. The two plates 10 and 11 each exceed the size of the aperture 9 of the roof of the vehicle. They form together with the springy, resilient strips 12 which are secured continuously in an air-tight manner at the edges 10a and 11a thereof and are formed in the manner of foldable bellows walls, a hollow chamber 13 of variable volume and having a movable outer plate 10.

The elastic strip 12 serving as lateral wall of the chamber 13 surrounds according to FIGURES 2 and 3 with its upper, slightly reinforced edge 12a the approximately horizontally outwardly offset free edge portion 10a of the outer plate of the sliding roof 8 and is secured thereon, for example, bonded or glued thereto. In a similar manner, the lower strip edge 12b is rigidly secured with the approximately horizontally outwardly projecting free part of the edge portion 11a of the inner plate 11. The strip 12 is drawn-in or curved inwardly between the two plates 10 and 11 in the direction toward the chamber interior. The chamber 13 is connected by way of a line 31 (FIG. 1) with an conventional source of vacuum (not shown), for example, with the suction line of the engine. A conventional magnetic valve (not shown) is arranged in this line 31. An adjusting lever pivotal into three positions is secured in the forward portion of the chamber 13 at the inner plate 11 which is appropriately apertured or recessed thereat. In the two outer positions 14a and 14b (FIG. 2) of the adjusting lever 14, the magnetic valve is so shifted by means of the shifting contacts 30 that it opens up the line 31. As a result thereof, the air is sucked out of the chamber 13 almost completely, the outer plate 10 moves inwardly and the sliding roof 8 can be advanced or retracted. In the center position of the lever 14, the magnetic valve blocks the connection with the vacuum and connects the chamber 13 with the atmospheric air which then is able to flow into the chamber 13.

Several coil springs 15 are securely arranged between the inner plate 11 and the outer plate 10, preferably near their lateral edges, and preferably along each longitudinal side of the sliding roof 8 and in the center at least four in number. All the coil springs 15 together with the springy strip 12 have a smaller spring force than the force exerted by the vacuum on the movable outer plate 10. On the other hand, the spring force exceeds naturally the weight of the outer plate 10 and of the insulation layer 16 secured to the lower surface thereof. A similar insulation layer against noise formation and against heat or cold transmission is secured on the inside at the inner plate 11. The insulation layers terminate at a sufficient distance from the lateral strips 12 inwardly folded with an empty chamber 13; also for each spring 15 sufficient space is provided, for example, recessed in the insulation layers. In order to be able to move the sliding roof 8 completely satisfactorily within the aperture 9, rectangularly shaped sheet metal strips 17 are secured at the lateral longitudinal edge portions of the inner plate 11 inwardly of the offset 11a (FIGS. 4 and 5) which rectangular strips 17 slidingly engage with sliding shoes 18 in the U-shaped guide bars 21 open toward the inside. The guide bars 21 are secured at the inner lateral wall 19 of roof rim bearers 20. The sheet metal strips 17 extend outwardly below the lower ends 12b of the lateral strips 12 and engage into the sliding grooves 21a of the rails 21 and thereby carry the sliding roof 8.

A web-shaped extension 22 projects upwardly from the guide rails 21. The extension 22 serves within the area of the roof aperture 9 as abutment for several tongues 23 which project outwardly beyond the lateral edges 10a of the outer plate 10. These extensions 22 protect the outer plate 10 which is pressed with an evacuated chamber 13 against the inner plate 11, against lateral tilting or canting while driving through curves or during other driving movements of the vehicle.

The web 22 of the guide rail 21 is bent inwardly approximately over the width of the rail within the area of the slide-in compartment 27 and forms the arm 22a extending approximately horizontally toward the center. The lateral tongues 23 which are slightly offset upwardly in a direction opposite to the offset portions 10a, engage into the groove formed by the arm 22a together with the upper leg portion of the guide rail 21 during retraction of the sliding roof 8 into the slide-in compartment or shelf 27. An abutment of the sliding roof 8 against the vehicle roof is thereby prevented within the area of the slide-in compartment 27; instead the outer plate 11 abuts in the described manner at the guide rails insofar as air flows into the chamber of the retracted sliding roof 8.

It may be appropriate to arrange in lieu of several tongues only one tongue 23 on each side approximately at the rear edge of the slide-in compartment, which tongue is constructed approximately of spherical shape at its end engaging below the arm 22a. The rear, flanged-over edge 24 of the roof aperture 9 (FIGS. 6 and 7) is appropriately reinforced by an embossed sheet metal strip 25 placed underneath the same. The reinforced upper strip edge 12a is pressed-in between the rear offset 10a of the sliding roof plate 10 and the edge 24 forms thereby a completely satisfactory seal. The bottom 26 of the slide-in compartment 27 is also reinforced in a similar manner within the area of the slide aperture 28. The same construction is selected analogously also along the other aperture edges.

In order to prevent damage of the sliding roof outer plate 10 in an intermediate position between closed and fully opened aperture 9, a slightly projecting, springy resilient strip may be inserted into the rear edge 24 of the aperture or a rubber strip may form the edge 24. In order to protect the sliding roof 8 stored in the slide-in compartment 27 against rattle noises between the roof 11 and the compartment bottom with an opened aperture 9, the web 22 may be bent inwardly at the end of the guide rails 21 for the accommodation of the tongues 23 projecting laterally outwardly out of the outer plate 10.

The emptying or evacuation of the chamber 13 takes place indirectly by movement of the adjusting lever 14 (FIGS. 1, 2 and 3). The adjusting lever 14 supported at the sliding roof bottom 11 by means of a reinforcing plate 29 is constructed at the same time as electric switch, which energizes in the two angular positions a magnetic valve (not shown) by way of a contact 30 each, which magnetic valve connects a line 31, itself connected with the rear end of the sliding roof chamber 13, with a vacuum tank dependent on the suction line of the engine. The respective quantity of air in the chamber 13 is relatively small by reason of the thick insulation layers 16 so that only a small vacuum output is necessary for lowering the outer plate 10.

The sliding shoes 18 in the guide bars appropriately consist of self-lubricating synthetic plastic material so that a slight finger pressure at the adjusting lever 14 in the desired direction moves the sliding roof 8 into the intended position.

The sliding roof 8 may be locked from within for a completely satisfactory locking and securing of the closed position. A latching bar 32 (FIG. 2) serves for this purpose which is secured below the switch-reinforcing plate 29 and which is provided with a recess 33 for the adjusting lever path. The forward end of the latching bar 32 is then secured in an appropriate manner against longitudinal displacement in the rearward direction at the forward roof frame cross bearer 34 within an ear or lug 34a or the like.

In lieu of several weak coil springs and instead of the bellows-like chamber side walls 12, a construction of the lateral walls made from appropriately inwardly folded spring steel strips is possible or the chamber may be constituted laterally of individual, slightly S-shaped curved spring steel strips. Of these strips, the ends directed toward the aperture center are connected with each other in an air-tight manner and the outer ends thereof are connected in an air-tight manner at the sliding roof outer cover as well as at the bottom plate of the sliding roof chamber outwardly projecting beyond the same.

Instead of the coil springs and of the insulation layers, layers of correspondingly soft rubber may be arranged as spring means at the mutually opposite faces of cover and bottom of the chamber. The spring force of these layers inclusive the chamber walls, however, should be smaller than the suction force produced by the vacuum.

While I have shown and described one embodiment in accordance with the present invention, it is understood that the same is not limited thereto but is susceptible of numerous changes and modifications as known to a person skilled in the art, and, I therefore do not wish to be limited to the details shown and described herein, but intend to cover all such changes and modifications as are encompassed by the scope of the appended claims.

I claim:

1. A sliding roof for vehicles having a roof aperture, especially for motor vehicles, comprising rigid outer and inner plate means, elastic connecting means connecting the edges of said plate means into a hollow chamber having a variable volume, resilient means normally urging said two plate means mutually apart, guide rail means in the vehicle roof, guide means for guiding one of said plate means in said guide rail means, and control means including switch means for selectively connecting the chamber in each position of the sliding roof either with a vacuum to reduce the volume of the hollow chamber and thereby facilitate movement of the sliding roof within the roof aperture or with the atmosphere to permit the increase of said volume and thereby fixing the sliding roof within the roof aperture.

2. A sliding roof according to claim 1, wherein the inner plate means is guided in said guide rail means and the outer plate means is movable relative to the inner plate means.

3. A sliding roof according to claim 2, wherein the elastic connecting means connecting the edges of the two plate means includes relatively thin strip means bent inwardly toward the roof center and made from springy, resilient material, said strip means forming the lateral walls of the chamber and being secured in an air-tight manner with its edges at the mutually offset edge portions of said plate means.

4. A sliding roof according to claim 3, wherein said means for urging said plate means mutually apart includes a plurality of coil springs arranged between the plate means, the spring force of all coil springs together with the spring force of the edge strip means being smaller than the force exerted by the vacuum on the outer plate means.

5. A sliding roof according to claim 4, wherein said coil springs are arranged near the lateral edges of the chamber.

6. A sliding roof according to claim 4, wherein said switch element includes a switch lever pivotally secured in the forward part of the inner plate means, a line connecting said chamber with a source of vacuum, and magnetic valve means in said line, said switching lever in the two lateral end positions thereof selectively opening and closing said magnetic valve means by way of contact means.

7. A sliding roof according to claim 6, wherein the roof includes roof rim bearer means having lateral wall means limiting the roof aperture, said guide rail means being secured at the lateral wall means of the bearer means and forming slide groove means, and strip means provided with slide shoe means engaging in the groove means of said guide rail means, said last-mentioned strip means being secured at the inner plate means and projecting laterally beyond the same.

8. A sliding roof according to claim 6, wherein said guide rail means are provided with an upwardly projecting web portion having at least one inwardly bent arm.

9. A sliding roof according to claim 8, wherein the outer plate means is covered on the inside thereof with an insulating layer.

10. A sliding roof according to claim 9, wherein the inner plate means is covered on the inside thereof with an insulation layer.

11. A sliding roof according to claim 10, wherein the insulation layers are provided with apertures for the spring means.

12. A sliding roof according to claim 1, wherein the elastic connecting means connecting the edges of the two plate means includes relatively thin strip means bent inwardly toward the roof center and made from springy, resilient material, said strip means forming the lateral walls of the chamber and being secured in an air-tight manner with its edges at the mutually off-set edge portions of said plate means.

13. A sliding roof according to claim 12, wherein said means for urging said plate means mutually apart includes a plurality of coil springs arranged between the plate means, the spring force of all coil springs together with the spring force of the edge strip means being smaller than the force exerted by the vacuum on the outer plate means.

14. A sliding roof according to claim 1, wherein said switch element includes a switch lever pivotally secured in the forward part of the inner plate means, a line connecting said chamber with a source of vacuum, and magnetic valve means in said line, said switching lever in the two lateral end positions thereof selectively opening and closing said magnetic valve means by way of contact means.

15. A sliding roof according to claim 1, wherein the roof includes roof rim bearer means having lateral wall means limiting the roof aperture, said guide rail means being secured at the lateral wall means of the bearer means and forming slide groove means, and strip means provided with slide shoe means engaging in the groove means of said guide rail means, said last-mentioned strip means being secured at the inner plate means and projecting laterally beyond the same.

16. A sliding roof according to claim 15, wherein said guide rail means are provided with an upwardly projecting web portion having at least one inwardly bent arm.

17. A sliding roof according to claim 15, wherein said means for urging said plate means mutually apart includes a plurality of coil springs arranged between the plate means, the spring force of all coil springs together with the spring force of the edge strip means being smaller than the force exerted by the vacuum on the outer plate means.

18. A sliding roof according to claim 15, wherein the elastic connecting means connecting the edges of the two plate means includes relatively thin strip means bent inwardly toward the roof center and made from springy resilient material, said strip means forming the lateral walls of the chamber and being secured in an air-tight manner with its edges at the mutually off-set edge portions of said plate means.

19. A sliding roof according to claim 1, wherein the outer plate means is covered on the inside thereof with an insulating layer.

20. A sliding roof according to claim 19, wherein the inner plate means is covered on the inside thereof with an insulation layer.

21. A sliding roof according to claim 20, wherein the insulation layers are provided with apertures for the spring means.

22. A sliding roof according to claim 15, wherein said switch element includes a switch lever pivotally secured in the forward part of the inner plate means, a line connecting said chamber with a source of vacuum, and magnetic valve means in said line, said switching lever in the two lateral end positions thereof selectively opening and closing said magnetic valve means by way of contact means.

References Cited
UNITED STATES PATENTS

| 1,718,183 | 6/1929 | Smith | 296—137 |
| 3,066,976 | 12/1962 | Rehmann | 296—137 |
| 3,078,122 | 2/1963 | Werner | 296—137 |

BENJAMIN HERSH, *Primary Examiner.*

J. SIEGEL, *Assistant Examiner.*